US006817693B2

(12) United States Patent
Phillips et al.

(10) Patent No.: US 6,817,693 B2
(45) Date of Patent: Nov. 16, 2004

(54) PRINTER CARTRIDGE WITH MEMORY FOR PRINTER CONTROL AND ADJUSTMENT OF PRINTER SETTINGS

(75) Inventors: Quintin T. Phillips, Boise, ID (US);
Joseph L. Burquist, Boise, ID (US);
Darius Boockholdt, Eagle, ID (US);
Robert E. Haines, Boise, ID (US);
Mark A. Harper, Middleton, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 88 days.

(21) Appl. No.: 10/195,113

(22) Filed: Jul. 12, 2002

(65) Prior Publication Data

US 2002/0171703 A1 Nov. 21, 2002

Related U.S. Application Data

(63) Continuation-in-part of application No. 09/410,989, filed on Oct. 1, 1999, now Pat. No. 6,494,562.

(51) Int. Cl.[7] .................................... B41J 29/393
(52) U.S. Cl. .................................................. 347/19
(58) Field of Search ........................... 347/19, 49, 50, 347/63; 399/12; 396/207

(56) References Cited

U.S. PATENT DOCUMENTS

| | | | | |
|---|---|---|---|---|
| 4,443,077 A | * | 4/1984 | Tanikawa | 396/207 |
| 6,039,430 A | * | 3/2000 | Helterline et al. | 347/19 |
| 6,366,742 B1 | * | 4/2002 | Reihl et al. | 399/12 |
| 6,431,673 B1 | * | 8/2002 | Heim et al. | 347/9 |

FOREIGN PATENT DOCUMENTS

| | | | | |
|---|---|---|---|---|
| EP | 1088667 A1 | | 4/2001 | |
| WO | WO 9852762 A2 | * | 11/1998 | B41J/2/01 |

* cited by examiner

*Primary Examiner*—K. Feggins

(57) ABSTRACT

A printing system utilizes printing material cartridges with memory to provide a way to uniquely identify the contents of a printing device cartridge and optimize printing parameters for use with the printing material. Newly developed printing materials and printing solutions therefor can be provided to printing devices that were manufactured prior to the development of the new printing material. Additionally, all cartridges can be physically similar without regard for the type of printing material contained therein, so no special manufacturing is required for each different printing material.

19 Claims, 3 Drawing Sheets

US 6,817,693 B2

PRINTER CARTRIDGE WITH MEMORY FOR PRINTER CONTROL AND ADJUSTMENT OF PRINTER SETTINGS

RELATED APPLICATIONS

This application is a continuation-in-part of U.S. patent application Ser. No. 09/410,989, entitled "Non-Contact Acumen Features," filed Oct. 1, 1999 now U.S. Pat. No. 6,494,562 by Robert Haines, a co-applicant of this application, and others.

TECHNICAL FIELD

This invention generally relates to printing material cartridges installable into printing devices, and more particularly, to printing material cartridges having a memory.

BACKGROUND

Most types of printing devices are equipped with replaceable printing material cartridges that hold printing material for the printing process. Such printing material cartridges include toner cartridges that contain laser printer toner, ink cartridges that contain different types of ink, and ribbon cartridges that include inked ribbons.

Many of these printing material cartridges contain printing materials that are specifically engineered to perform a certain type of printing task. For example, some printing material cartridges may contain a printing material that is particularly suited for use with a certain type of print medium. Other printing material cartridges may contain a printing material that is useful for print jobs that do not require premium print quality and is made primarily to conserve printing material.

For each of these special types of printing material cartridges, variable print parameters in the printing device must be set to optimum levels so that the printing device properly utilizes the specialty printing material. The combination of settings of print parameters is known as the printing solution for the printing material.

Typically, the printing material cartridge is constructed with physical design features so that the printing device can identify the cartridge as containing specialty printing material and make appropriate configuration changes to offer the proper printing solution for the printing material. However, providing unique physical design features for various printing material cartridges presents significant disadvantages for manufacturers and users alike.

One problem with customizing cartridges with physical design features is that only the specialty printing materials and printing solutions known to the printing device manufacturer at the time of manufacture can be accommodated in the printing device. There is no way to utilize newly developed specialty printing materials in printing devices that were manufactured before the new specialty printing materials were developed, either because the printing device cannot be altered to accept a printing material cartridge with new physical characteristics or because the printing device cannot know the printing solution for the new specialty printing material.

Another problem is that unique parts must be designed, integrated and marketed for each printing device cartridge design. This makes the specialty printing materials more expensive for the user and discourages the use of the specialty printing materials. Using a specialty printing material with a generic printing solution can cause damage to a printing device and/or produce unacceptable output.

SUMMARY

A printing system utilizes printing material cartridges with memory to provide a way to uniquely identify the contents of a printing device cartridge and optimize printing parameters for use with the printing material. In addition, data stored in the cartridge memory may be used to control the operation and status of a printer in which the cartridge is installed.

Printing material cartridges are made which have memory placed on the cartridge itself or within the label affixed to the cartridge. This memory is used to store various information regarding the cartridge, such as the number of pages that have been printed using the cartridge so that the printer may estimate how many more pages may be printed using the same cartridge. Another example of a way in which such memory is utilized is that the memory may store the model number of the cartridge so that the printing device may recognize the cartridge as valid or invalid for use with that printing device.

The present invention contemplates utilizing this memory to store printer settings that should be used when printing with the printing material contained in the printing material cartridge to obtain optimum performance. Newly developed printing materials and printing solutions for them can be provided to printing devices that were manufactured prior to the development of the new printing material. Also, all cartridges can be physically similar without regard for the type of printing material contained therein. Therefore, no special manufacturing is required for each specialty printing material.

In one implementation described herein, data stored in the cartridge memory is used to halt printer operations in particular situations, such as when operation of a printer configured in a certain way will cause damage if used with the specialty toner contained in the cartridge or if use of the specialty toner is inadvisable for any other reason.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
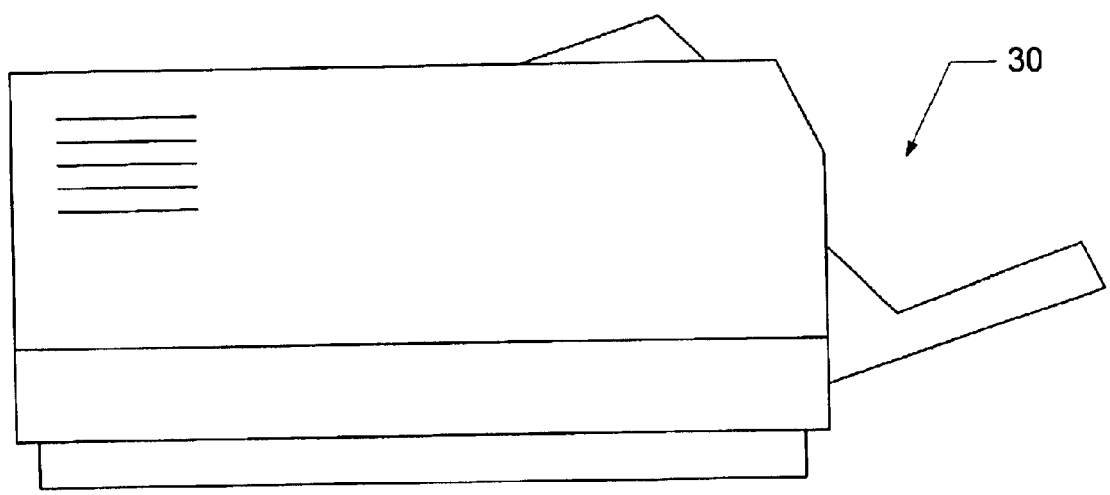
FIG. 1 is a diagrammatic illustration of a laser printer.

FIG. 1 is a diagrammatic illustration of a laser printer 30 in which the present invention may be implemented. The invention may further be implemented in other units that employ printing devices, such as scanners, photocopiers, facsimile machines, and the like. For purposes of discussion, the invention is described in the context of laser printers.

Figure 2:
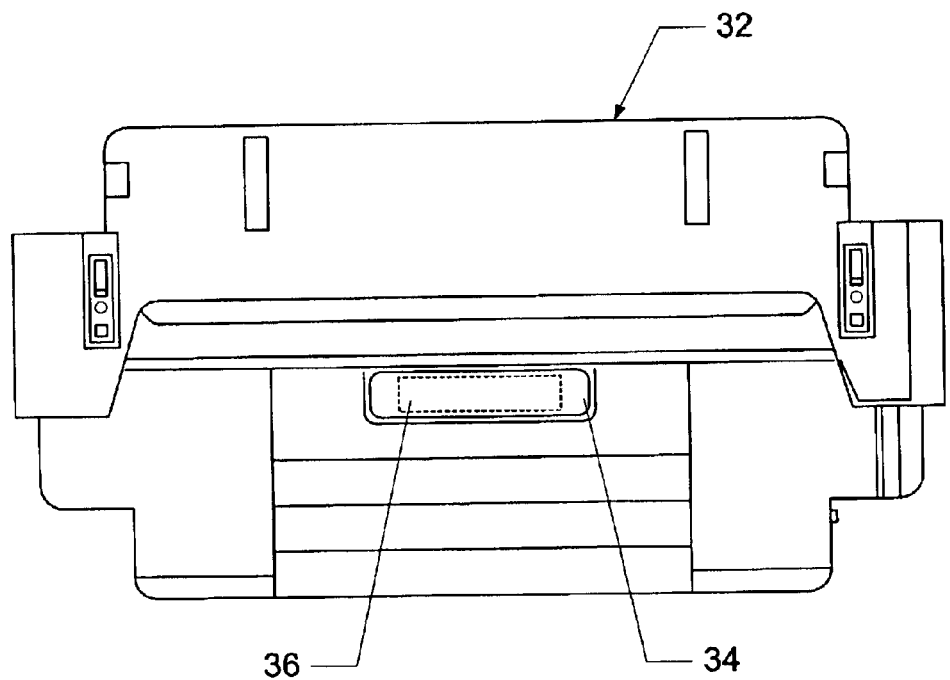
FIG. 2 is a diagrammatic illustration of a laser printer toner cartridge.

FIG. 2 shows a toner cartridge 32 that is installable in the laser printer 30. The toner cartridge 32 has a label 34 that contains information identifying the toner cartridge 32 to a user. The label 34 typically recites the name of the manufacturer, the model number of the cartridge, etc. Although the invention is shown and described herein embodied as a printer toner cartridge for a laser printer, it is noted that the invention may be embodied as any printing material cartridge (toner cartridge, ink cartridge, ribbon cartridge, etc.) installable in a printing device (printer, copier, fax machine, etc.).

A memory tag 36 is located underneath the label 34 on the toner cartridge 32, although the memory tag 36 may be placed on the toner cartridge 32 at any location which may be practical for the purposes described herein. The memory tag 36 is preferably a radio frequency identification (RFID) memory tag. RFID memory tags and applications therefor are well known in the art. Further aspects of the RFID memory tag 36 structure and its functionality in the present invention will become clearer as the discussion progresses.

Figure 3:
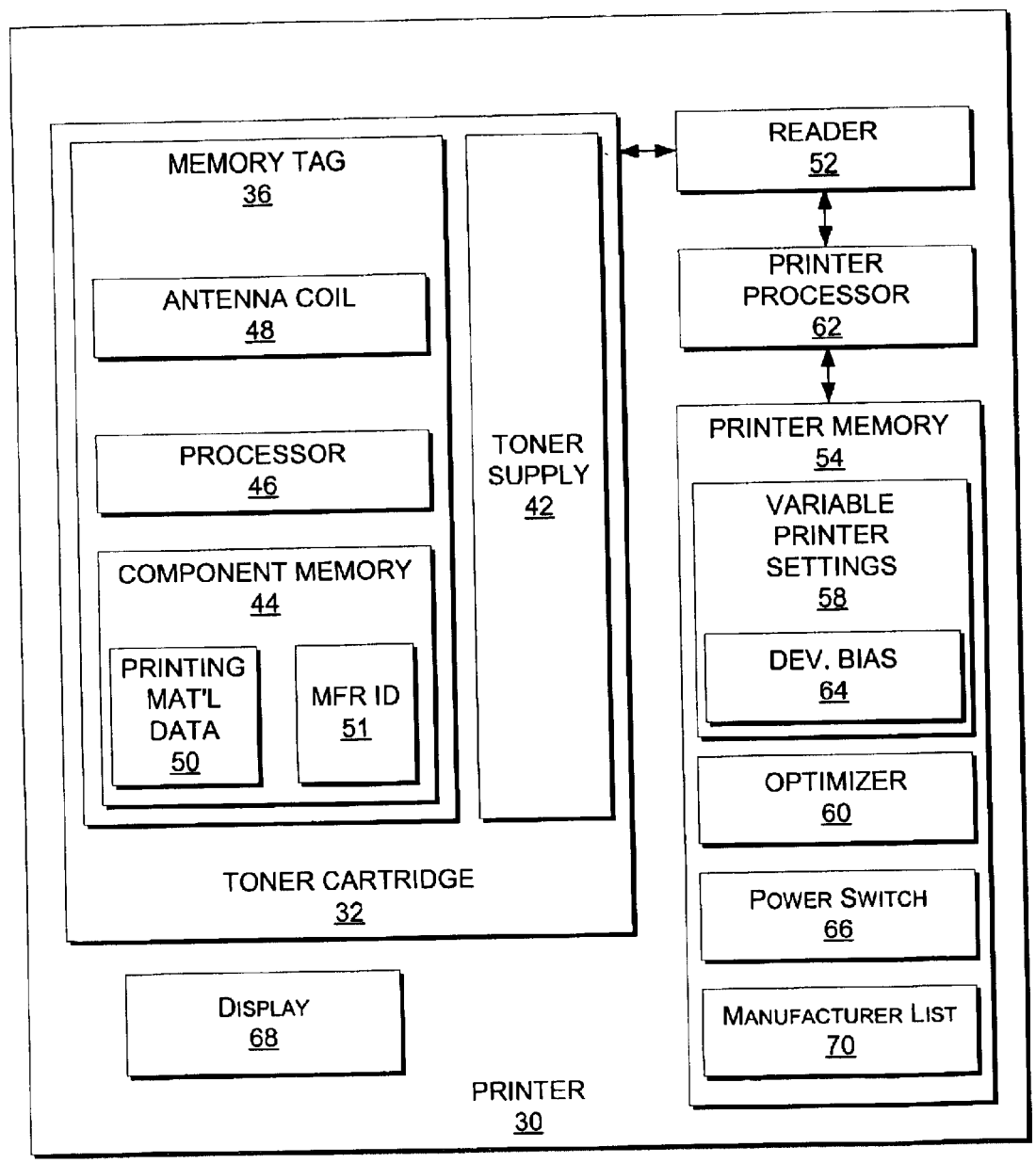
FIG. 3 is a block diagram of a printing system utilizing the present invention.

FIG. 3 is a block diagram of printing system 40 with toner cartridge 32 installed therein. The cartridge 32 is replaceable and may be removed and replaced by another toner cartridge (not shown). The toner cartridge 32 includes the memory tag 36 and a toner supply 42.

As previously stated, the memory tag 36 is an RFID memory tag, although it is noted that the memory tag 36 may be conventional semiconductor memory or a magnetic strip. The RFID memory tag 36 has component memory 44, a processor 46, and an antenna coil 48. The component memory 44 has printing material data 50 and a manufacturer identifier 51 stored therein. The format and function of the printing material data 50 will be described in further detail below.

The RFID memory tag 36 is designed to operate in conjunction with an interrogating device, also known as an interrogator. An interrogator is a device that provides power to, reads from and/or writes to the memory tag 36. Examples of interrogators include a memory tag reader or scanner, a memory tag writing device which stores data on the memory tag 36, and the like. In the present example, the laser printer 30 includes an interrogator 52.

The interrogator 52 emits a radio frequency field that provides power to the memory tag 36 via the antenna coil 48. The memory tag 36, therefore, does not require its own power supply, a feature that adds to the cost efficiency and practicality of utilizing RFID memory for the memory tag 36.

Communications between the interrogator 52 and the RFID memory tag 36 are transmitted and received via the radio frequency field and the antenna coil 48 utilizing standard RFID method and protocol, such as promulgated in ISO 14443 and ISO 15693. Therefore, physical contact between the memory tag 36 and the printer 30 is not required for the printer 30 to communicate with the memory tag 36.

It is noted that if the magnetic strip (not shown) is used in place of the RFID memory tag 36, the printer 30 would necessarily be equipped with a magnetic strip reader to effectuate the transfer of information from the toner cartridge 32 to the printer 30. Likewise, if conventional semiconductor memory (not shown) is used in place of the RFID memory tag 36, the printer 30 would be required to have a memory contact so that information located in the memory could be electronically transferred to the printer 30.

The printer 30 has a printer memory 54 that contains variable printer parameter settings 56. The settings can be altered to provide an optimum printing solution for different types of toner, print media, environmental conditions, etc. The printer memory 54 also contains an optimizer 60 that, when executed on a printer processor 62, optimizes the variable printer parameter settings 58 for use under certain conditions or with certain printing materials. The optimizer 60 is also configured to compare a printer configuration with the printing material data 50 and to determine if there is a mismatch between the two. A mismatch occurs when using the printing material having properties identifies by the printing material data 50 is inadvisable because the printer 30 or some component will be damaged, because the printing quality may be inferior, or because any other reason that a user may wish to reconsider using the printing material with the printer 30.

The printer 30 includes a software power switch 66 that may be activated to turn electrical power to the printer 30 on, or de-activated to turn power to the printer 30 off. The printer also includes a display 68 that may be used to display messages to a printer user. A manufacturer list 70 is stored in the printer memory 54 and identifies one or more approved manufacturers. The manufacturer list 70 is used to identify printer components that are compatible with the printer 30. Practical use of the manufacturer list 70 will be described in greater detail below.

It is noted that although the functional components of the printing system 40 are shown in specific locations, the functional components may be located on the printer 30, the toner cartridge 32, or a location external to the printing system 40 provided the functionality of the printing system 40 is preserved.

Figure 4:
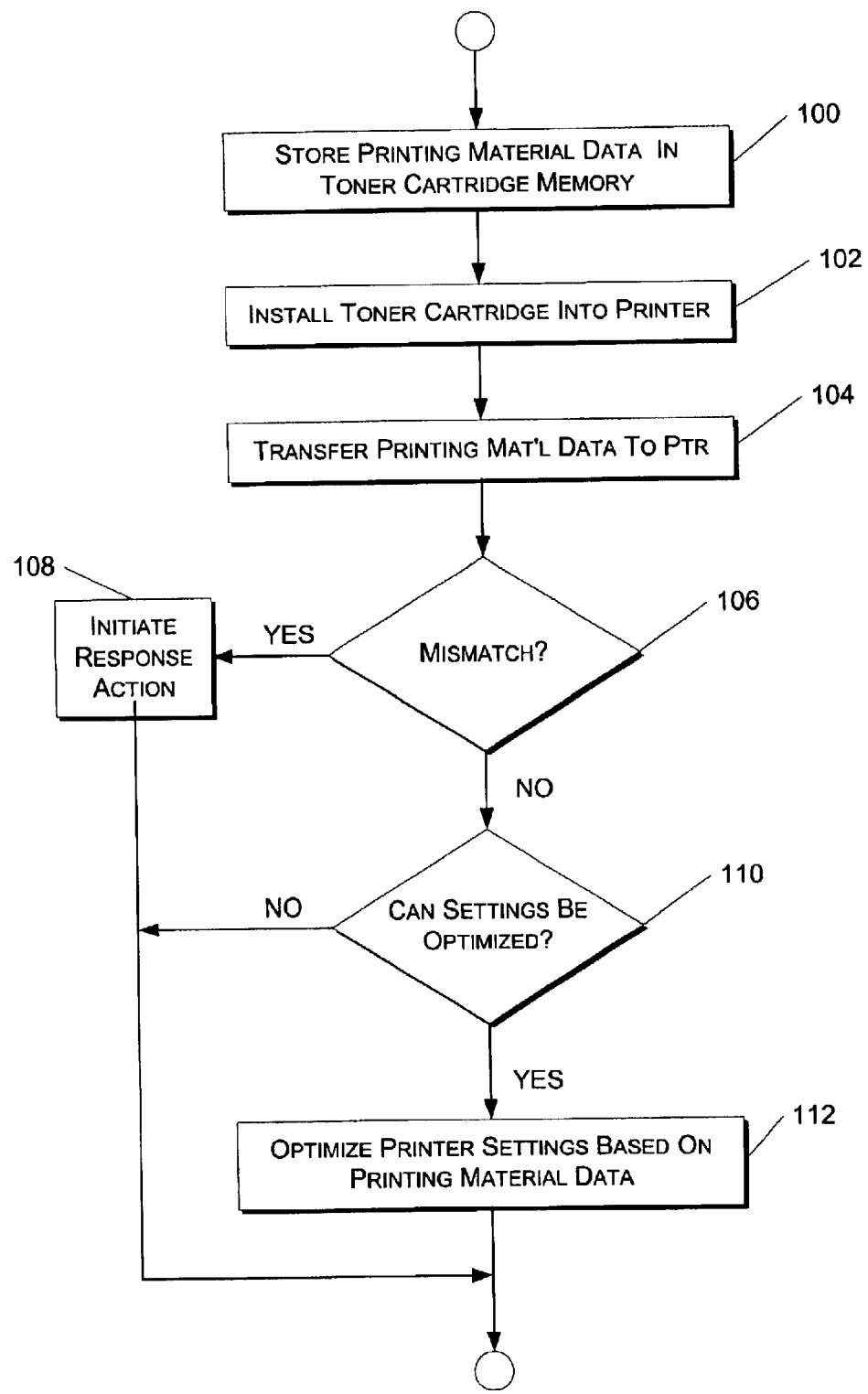
FIG. 4 is a flow diagram of a process to optimize printer parameter settings for use with a specific printing material.

FIG. 4 depicts a flow diagram of a process to optimize printer parameter settings for use with a specific printing material and/or to control the printer 30 depending on the specific printing material. At step 100, the printing material data 50 is stored in the component memory 44 of the toner cartridge 32. This step is accomplished by the manufacturer of the toner cartridge 32 during the manufacturing process. The printing material data 50 is data indicative of one or more special characteristics of the toner contained in the toner cartridge 32 or of the toner cartridge 32 itself.

For example, low pile height toners are available which comprise smaller toner particles than conventional toner. When a low pile height toner is used in a printing process, approximately the same amount of toner particles is used that would be used with a conventional toner. Because the low pile height toner has smaller toner particles, a smaller volume of toner will be used to print a page, resulting in lighter print, which is acceptable for some users. As a result of using a smaller volume of toner for a print job, the life of the toner cartridge will be extended.

However, extended cartridge life is undesirable for some customers. Customers who print under conditions that cause high photoconductor wear would not benefit from extending the life of the cartridge because the photoconductor would wear out before the toner supply 44 is exhausted. To extend the life of a toner cartridge for these customers requires constructing the toner cartridge 32 with a high durability photoconductor, which will last as long as the toner.

A manufacturer does not want to burden normal printer users with the additional cost of a cartridge with a high durability photoconductor. Therefore, the manufacturer differentiates between normal toner cartridges and toner cartridges having more expensive components by use of the printing material data 50. In the present example, the printing material data 50 provides an indication to the printer 30 whether the toner cartridge 32 contains a low pile height toner.

The optimizer 60 is configured to determine if the printer 30 is configured in such a way that the configuration does not support—or should not be used with—the low pile height toner. If the two are incompatible, the optimizer 60 determines that there is a mismatch and a response action is initiated. The response action may include displaying a user warning message to a printer user, or rendering the printer 30 inoperable by shutting off power to the printer 60 via the power switch 66.

Other examples of specialty toners include toners that are specially formulated to print on a special, alternate print medium. Use of some alternate print media causes excessive buildup of debris on printer components, such as the photoconductor. Specialty toners are made which contain a scrubbing agent additive that abrades such buildup and enables the printer to function with the alternate print medium without damaging the printer 30 or its components. In this case, the printing material data 50 would provide an indication to the printer 30 that the toner cartridge 32 contains a toner with a scrubbing agent additive, thereby enabling the printer 30 to print using an alternate print medium.

If the optimizer 60 determines that there is a mismatch between a configuration of the printer 30 and the toner with a scrubbing agent, then a response action is initiated. The response action may comprise displaying a user warning message or shutting down the printer 30. The response action can be any other action necessitated by using the specialty toner with the printer configuration.

Other types of toner may require a specific setting of a certain printer parameter. For instance, some toners produce better results when a development bias 64 of the printer is set to an optimum voltage level. For these toner cartridges, the printing material data 50 would provide an indication to the printer 30 that the development bias 64 of the printer should be set to the optimum voltage level.

If the development bias 64 cannot be set to the optimum voltage level, then the optimizer 60 detects a mismatch and a response action is initiated. The response action includes, but is not limited to, displaying a user warning message indicating that the toner should not be used with the printer, or Continuing with FIG. 4, the user installs the toner cartridge 32 into the printer 30 (step 102) and the interrogator 52 reads the printing material data 50 from the component memory 44 (step 104). At step 106, the printer 30 determines if utilizing the printer 30 with its current configuration and with the specialty toner contained in the toner supply 42 of the toner cartridge 32 constitutes a mismatch, i.e., would cause damage to the printer 30, would necessitate a user warning message, or would require the printer 30 to be shut down for any other reason. For example, if the printer 30 contains a component that should not be used with certain types of toner, and the toner supply 42 includes one such type of toner, it may be desirable to display a user warning or to shut down the printer 30 to avoid damage to the particular component of the printer 30. If a response action, i.e., a warning or shutdown, is advisable ("Yes" branch, step 106), then a response action is initiated at step 108. A response action may be de-activating the power switch 66 to shut off electrical power to the printer 30 (in case of shutdown), or displaying a warning message to the user on the display 68 of the printer 30. Otherwise ("No" branch, step 106), the printer 30 remains operational in a normal mode.

In one implementation, a warning is displayed or a printer shutdown occurs in an event wherein the manufacturer identifier 51 does not conform to a pre-defined standard. For example, the printer 30 may be configured to operate normally only if the manufacturer identifier 51 identifies a valid or approved manufacturer. If the manufacturer identifier 51 identifies an invalid or non-approved manufacturer, a warning may issue or the printer 30 may be shut down. This situation might occur where it is known that use of a certain manufacturer's products are likely to cause damage to the printer 30.

In one implementation, the manufacturer identifier 51 is compared to the manufacturer list 70 to determine if the cartridge manufacturer 51 is an approved manufacturer. If the manufacturer identifier 51 is contained in the manufacturer list 70, then printing may resume in normal mode. If not, a mismatch is detected and a response action is initiated at step 108.

At step 110, the printer 30 determines if it can optimize the variable printer parameter settings 58 using the printing material data 50. This would depend on if the printer 30 has been programmed to recognize the printing material data 50 and alter the variable printer parameter settings 58 based on the printing material data 50.

If the printer 30 does not recognize the printing material data 50, it determines that it cannot alter the variable printer parameter settings 58 and the optimization process is terminated ("NO" branch, step 110). If, however, the printer 30 recognized the printing material data 50 ("YES" branch, step 110), the optimizer 60 alters the variable printer parameter settings 58 to an optimal printing solution for the toner contained in the toner cartridge 32 (step 112).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A printer comprising:
   a toner cartridge containing laser printer toner having a low pile height, a high durability photoconductor and having memory integrated therein that stores printing material data that indicates the toner cartridge contains low pile height toner;
   a processor configured to retrieve the printing material data;
   an optimizer to adjust printer parameter settings based on the printing material data to optimize printer performance for use with the printing material; and
   wherein the optimizer is further configured to initiate a response action if the printer is not properly configured to use a toner cartridge that includes a low pile height toner.

2. The printer as recited in claim 1, wherein the response action further comprises shutting off power to the printer in the event a mismatch is detected between the printing material data and the printer configuration.

3. The printer as recited in claim 1, wherein the response action further comprises displaying a user warning message.

4. A printer comprising:
   a toner cartridge containing laser printer toner that includes a scrubbing agent and having memory integrated therein that stores printing material data that indicates the toner contains a scrubbing agent;
   a processor configured to retrieve the printing material data;
   an optimizer to adjust printer parameter setting based on the printing material data to optimize printer performance for use with the scrubbing agent toner; and wherein the optimizer is further configured to initiate a response action if the printer is not properly confined to use a toner that includes a scrubbing agent.

5. The printer recited in claim 1 wherein the memory comprises radio frequency identification (RFID) memory, and the printer further comprises an RFID interrogator.

6. The printer recited in claim 1 wherein the memory comprises a magnetic strip, and the printer further comprises a magnetic strip reader.

7. The printer recited in claim 1 wherein the memory comprises conventional semiconductor memory, and the printer further comprises a memory contact to establish a data pathway between the semiconductor memory and the printer.

8. A printer comprising:
   a development bias setting that is set to one of multiple voltage levels;
   a toner cartridge containing laser printer toner that is designed for use with an optimum development bias voltage setting and having memory integrated therein that stores printing material data that indicates the optimum development bias voltage setting;
   a processor configured to retrieve the minting material data;
   an optimizer to adjust printer parameter settings based on the printing material data and to initiate a response action if the development bias setting cannot be set to the optimum voltage setting and to initiate an action in response thereto.

9. A printer cartridge installable into a printer having a variable printer parameter setting, the printer cartridge comprising:
   a low pile height toner;
   memory containing printing material data identifying the low pile weight toner that is transferable to the printer, the printing material data enabling the printer to set the variable printer parameter setting to an optimum setting for use with the low pile height toner and to initiate a response action in the event that the variable printer parameter cannot be set to the optimum setting.

10. A printer cartridge installable into a printer having a variable printer parameter setting, the printer cartridge comprising:
   scrubbing agent toner;
   memory containing printing material data identifying the scrubbing agent toner that is transferable to the printer, the printing material data enabling the printer to set the variable printer parameter setting to an optimum setting for use with the scrubbing agent toner and to initiate a response action in the event that the variable printer parameter setting cannot be set to the optimum setting.

11. A printer cartridge installable into a printer that has a variable development bias voltage setting, the printer cartridge comprising:
   memory containing minting material data identifying an optimum development bias voltage setting that is transferable to the printer, the printing material data enabling the printer to set the variable development bias voltage setting to the optimum development bias voltage setting and to initiate a response action in the event that the variable development bias voltage setting cannot be set to the optimum development bias voltage setting.

12. The printer as recited in claim 11, wherein the response action further comprises displaying a user warning.

13. The printer as recited in claim 11, wherein the response action further comprises shutting off power to the printer.

14. A method for optimizing operation of a laser printer having a high durability photoconductor for use with a low pile height toner and a replaceable toner cartridge that has memory that stores printing material data, the method comprising:
   retrieving the printing material data after the replaceable toner cartridge has been installed into the laser printer;
   determining from the printing material data if the toner cartridge contains low pile height toner; and
   initiating a response action if the toner cartridge does not contain low pile height toner.

15. The method recited in claim 14 wherein the response action further comprises interrupting power to the printing device so that the printing device is not operational.

16. The method as recited in claim 14, wherein the response action further comprises displaying a warning message that indicates a mismatch between the printing material and the printer configuration.

17. A method for optimizing operation of a laser printer having a replaceable toner cartridge with memory that stores printing material data, the method comprising:
   retrieving the printing material data after the replaceable toner cartridge has been installed into the laser printer;
   determining from the printing material data that the toner cartridge contains toner that includes a scrubbing agent;
   if possible, setting a variable printer parameter of the laser printer to an optimum setting for use with the scrubbing agent toner; and
   initiating a response action if the variable printer parameter cannot be set to the optimum setting.

18. A method for optimizing operation of a laser printer having a replaceable toner cartridge with memory that stores printing material data, the method comprising:
   retrieving the printing material data after the replaceable toner cartridge has been installed into the laser printer
   determining an optimum printer development bias voltage setting from the printing material data;
   if possible, setting a variable printer development bias voltage of the laser printer to the optimum printer development bias voltage setting; and
   initiating a response action if the variable printer development bias voltage cannot be set to she optimum printer development bias voltage setting.

19. The method recited in claim 18 wherein the response action further comprises displaying a warning message that indicates the variable printer development bias voltage cannot be set to optimum printer development bias voltage setting.

* * * * *